United States Patent
Shieh et al.

(10) Patent No.: US 10,558,334 B2
(45) Date of Patent: Feb. 11, 2020

(54) ELECTRONIC DEVICE AND METHOD FOR MESSAGING

(71) Applicant: HTC Corporation, Taoyuan (TW)

(72) Inventors: Chia-Chia Shieh, Taoyuan (TW); Yen-Shun Wu, Taoyuan (TW); Shih-Hsun Ou, Taoyuan (TW); Ting-An Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 287 days.

(21) Appl. No.: 14/660,953

(22) Filed: Mar. 18, 2015

(65) Prior Publication Data

US 2015/0277685 A1     Oct. 1, 2015

Related U.S. Application Data

(60) Provisional application No. 61/972,434, filed on Mar. 31, 2014.

(51) Int. Cl.
*G06F 3/16* (2006.01)
*G06F 3/0484* (2013.01)
(Continued)

(52) U.S. Cl.
CPC .......... *G06F 3/0484* (2013.01); *G06F 3/0412* (2013.01); *G06F 3/0416* (2013.01);
(Continued)

(58) Field of Classification Search
CPC .. G06F 3/0488; G06F 3/0481; G06F 3/04886; G06F 3/0416; G06F 3/017;
(Continued)

(56) References Cited

U.S. PATENT DOCUMENTS 6,031,915 A * 2/2000 Okano ............... G11B 19/20
                                                              381/110
6,633,746 B1   10/2003 Walsh et al.
(Continued)

FOREIGN PATENT DOCUMENTS

| EP | 2631762 A1 | 8/2013 |
| TW | 201222394 A | 6/2012 |

(Continued)

OTHER PUBLICATIONS

Corresponding Taiwanese Notice of Allowance that these art references were cited dated Jun. 16, 2016.
(Continued)

*Primary Examiner* — Di Xiao
(74) *Attorney, Agent, or Firm* — CKC & Partners Co., LLC

(57) ABSTRACT

An electronic device, a method and a non-transitory computer-readable medium of messaging are disclosed herein. The electronic device includes at least one processor, a touch-sensitive module, a display module and a non-transitory computer-readable medium. The non-transitory computer-readable medium includes one or more sequences of instructions to be executed by the processor for performing a messaging method. The messaging method includes the following steps: sensing a touch corresponding to a first contact icon displayed on the display module; counting a time duration of the touch; recording a message when the time duration exceeds a first predetermined time period; and sending the message according to contact information corresponding to the first contact icon.

18 Claims, 12 Drawing Sheets

(51) Int. Cl.
  *G06F 3/041*   (2006.01)
  *G06F 3/0481*  (2013.01)
  *G06F 3/0488*  (2013.01)
  *H04L 12/58*   (2006.01)

(52) U.S. Cl.
  CPC ...... *G06F 3/04817* (2013.01); *G06F 3/04842* (2013.01); *G06F 3/04883* (2013.01); *H04L 51/04* (2013.01)

(58) Field of Classification Search
  CPC .... G06F 3/04883; G06F 1/1633; G06F 3/041; G06F 3/0418; G06F 3/023; G06F 3/0482
  See application file for complete search history.

(56) References Cited

U.S. PATENT DOCUMENTS

| | | | |
|---|---|---|---|
| 7,224,991 B1 | 5/2007 | Fuoss et al. | |
| 9,448,692 B1* | 9/2016 | Mierau | G06F 3/04817 |
| 2007/0157089 A1 | 7/2007 | Van Os et al. | |
| 2007/0238474 A1* | 10/2007 | Ballas | H04L 12/5895 |
| | | | 455/466 |
| 2008/0055269 A1* | 3/2008 | Lemay | G06F 3/0482 |
| | | | 345/173 |
| 2010/0125801 A1* | 5/2010 | Shin | G06F 1/1616 |
| | | | 715/758 |
| 2010/0269040 A1 | 10/2010 | Lee | |
| 2011/0117939 A1* | 5/2011 | Shaw | H04L 51/36 |
| | | | 455/466 |
| 2012/0105203 A1 | 5/2012 | Elliot et al. | |
| 2012/0256959 A1* | 10/2012 | Ye | G06F 3/0488 |
| | | | 345/649 |
| 2013/0111415 A1* | 5/2013 | Newman | G06F 1/3203 |
| | | | 715/864 |
| 2014/0035826 A1* | 2/2014 | Frazier | G06F 3/0482 |
| | | | 345/173 |
| 2014/0181751 A1* | 6/2014 | Won | G06F 3/0488 |
| | | | 715/835 |
| 2014/0317660 A1* | 10/2014 | Cheung | H04N 21/6175 |
| | | | 725/44 |

FOREIGN PATENT DOCUMENTS

| | | |
|---|---|---|
| TW | 201324299 A | 6/2013 |
| TW | 201342188 A | 10/2013 |

OTHER PUBLICATIONS

Corresponding extended European Search Report that these art references were cited dated Aug. 17, 2015.
Official Communication issued by corresponding European Patent Office dated Jul. 4, 2016.
Corresponding Taiwanese Office Action that these art references were cited dated Dec. 13, 2016.

* cited by examiner

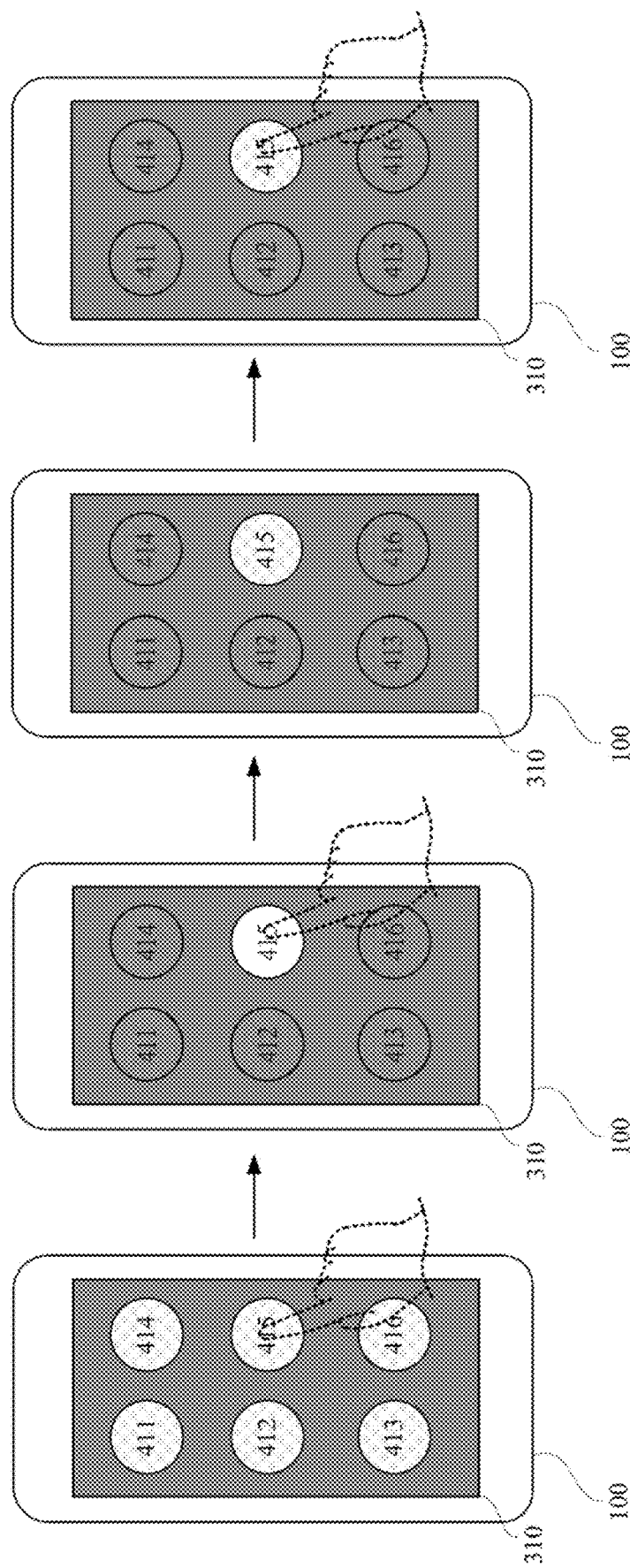

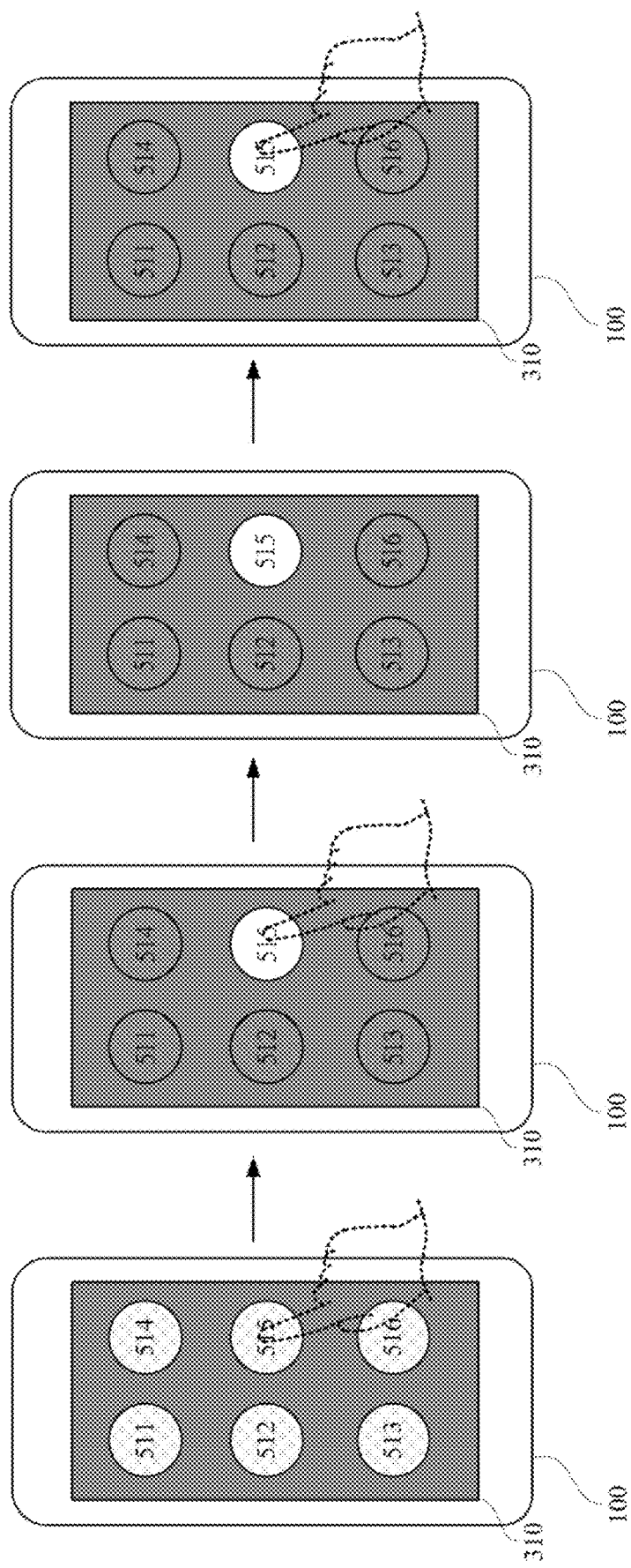

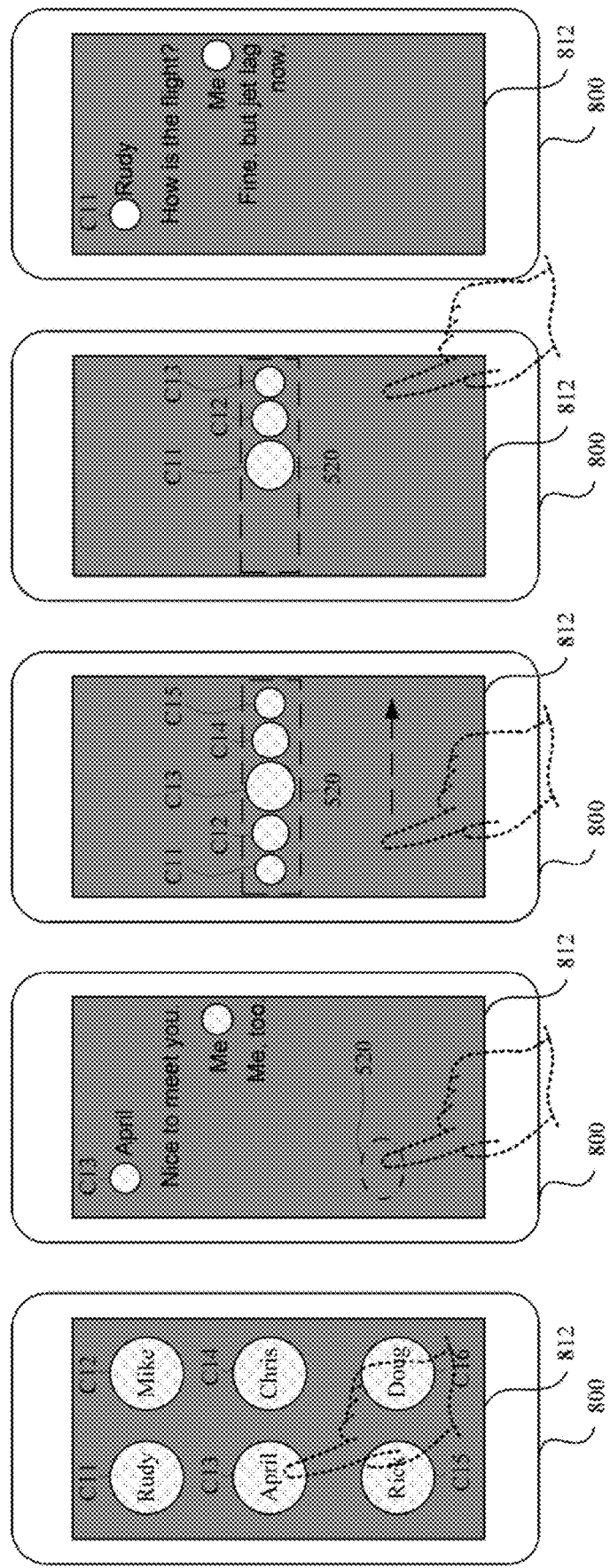

ELECTRONIC DEVICE AND METHOD FOR MESSAGING

RELATED APPLICATIONS

This application claims the priority benefit of U.S. Provisional Application Ser. No. 61/972,434, filed Mar. 31, 2014, which is herein incorporated by reference.

BACKGROUND

Field of Invention

The present disclosure relates to an electronic device. More particularly, the present disclosure relates to an electronic device of messaging.

Description of Related Art

At recent years, due to the advancement of mobile devices and network technology, applications of instant messaging have captured much attention. In addition, since transmission/reception rate of wireless communication is significantly increasing, the application programs of instant messaging are intended to replace regular phone calls as the mediums of communication between people. Nowadays, the application programs normally include different types of message transmission/reception, such as transmission/reception of videos, streaming videos, texts or icon, which makes communication between people more diversified.

However, it may be complicated or not user-friendly in operating or manipulating the instant messaging programs on a mobile device, because input modules on the mobile device might be limited. To be more precisely, the operations of instant messaging program nowadays require too many procedures. For instance, when a user tries to send a voice message to a certain contact, the user is required to find and touch the certain contact icon, to select a type of message (i.e., the voice message) and to touch multiple icons corresponding to starting to record the voice message, to finishing recording the voice message and to sending the voice message to the certain contact.

As a result, there is a need to provide more intuitional electronic device and method to assist the user in sending messages.

SUMMARY

The disclosure provides an electronic device. The electronic device includes at least one processor, a touch-sensitive module, a display module and a non-transitory computer-readable medium. The non-transitory computer-readable medium comprises one or more sequences of instructions to be executed by the processor for performing a messaging method. The method includes the following steps: sensing a touch corresponding to a first contact icon displayed on the display module; counting a time duration of the touch; recording a message when the time duration exceeds a first predetermined time period; and sending the message according to contact information corresponding to the first contact icon.

In some embodiment, in response to an incoming message is received by the electronic device when the electronic device is in a standby mode or currently executing a second application program different from the first application program, the messaging method further includes steps of: displaying a notification for indicating the incoming message on the display module; sensing a second touch corresponding to a notification displayed on the display module; counting a second time duration of the second touch; recording a reply message when the second time duration exceeds a third predetermined time period; and, sending the reply message according to contact information corresponding to the incoming message.

The disclosure provides a messaging method. The messaging method includes the following steps: sensing a touch corresponding to a first contact icon displayed on a display module; counting a time duration of the touch; recording a message when the time duration exceeds a first predetermined time period; and sending the message according to contact information corresponding to the first contact icon.

The disclosure provides a non-transitory computer-readable medium including one or more sequences of instructions which, when executed by at least one processor, are for performing a messaging method, in which the method includes the following steps: sensing a touch corresponding to a first contact icon displayed on a display module; counting a time duration of the touch; recording a message when the time duration exceeds a first predetermined time period; and sending the message according to contact information corresponding to the first contact icon.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

FIGS. 4A-4D are a series of operation flow diagrams of the electronic device according to one embodiment of this disclosure; and FIGS. 5A-5D are a series of operation flow diagrams of the electronic device according to one embodiment of this disclosure.

FIGS. 12A-12E are a series of operation flow diagrams of the electronic device according to one embodiment of this disclosure.

DETAILED DESCRIPTION

Figure 1:
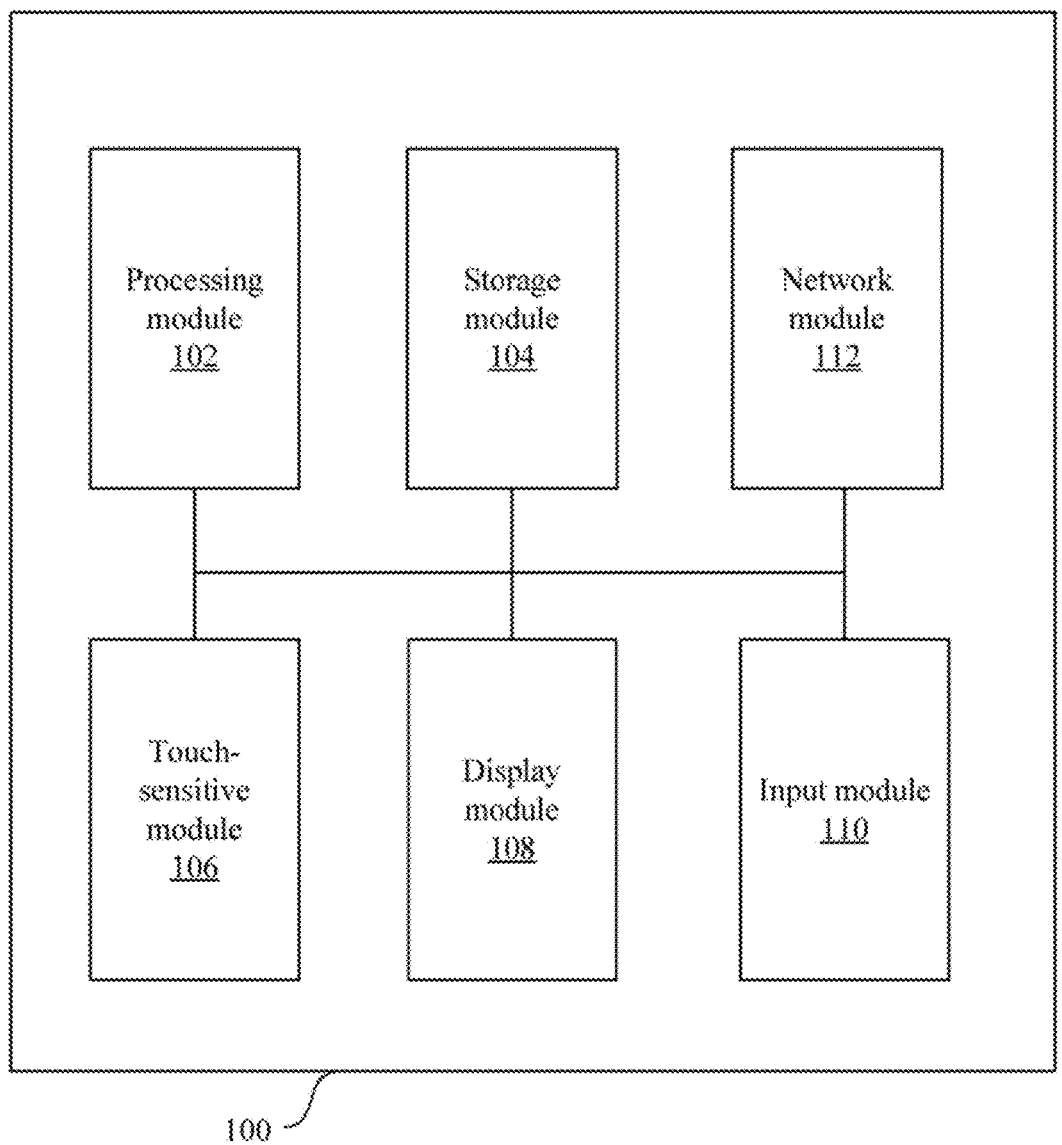
FIG. 1 is a schematic diagram illustrating an electronic device according to one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Referring to FIG. 1, FIG. 1 is a schematic diagram illustrating an electronic device 100 according to one embodiment of this disclosure. The electronic device 100 includes a processing module 102, a storage module 104, a touch-sensitive module 106, a display module 108, an input module 110 and a network module 112. The processing module 102, the storage module 104, the touch-sensitive module 106, the display module 108 the input module 110 and the network module 112 are electrically coupled.

The processing module 102 comprises at least one processor. The processor is configured to load and execute at least one program code from the storage module 104. In addition, the processing module 102 is configured to receive signals transmitted from the touch-sensitive module 106 and from the input module 110 respectively, and the processing module 102 is also configured to transmit signals to the touch-sensitive module 106, the display module 108 and the input module 110 respectively.

In some embodiments, the processing module 102 is configured to load and execute another program code from an externally connected device.

The storage module 104 is configured to store at least one program code, in which the program code comprises one or more sequences of instructions.

The touch-sensitive module 106 is configured to sense a touch from a user and to transmit the signal corresponding to the touch to the processing module 102.

The display module 108 is configured to display images or videos according to display signals transmitted from the processing module 102.

In some embodiments, the display module 108 and the touch-sensitive module 106 may be integrated into a touch-sensitive display unit, in which the touch-sensitive display unit may be a touch display panel.

The input module 110 is configured to record a message, in which the message may be a voice message, an audio message, a video message or a text message. When the input module 110 records the message completely, the input module 110 transmits the message back to the processing module 102. In some embodiments, the text message is converted from another voice message by a voice recognition program, in which the input module records another voice message.

In some embodiments, the input module 110 comprises at least one microphone, at least one image capturing element, at least one video capturing element, a keyboard or a touch pad.

In some embodiments, the input module 110 may be the touch-sensitive module 106.

In some embodiments, the input module 110 may transmit the message to the network module 112 directly.

The network module 112 is configured to transmit or receive data through a wireless or wired network. In the present embodiment, the network module 112 is configured to transmit the message, which is recorded by the input module 112 or further processed by the voice recognition program.

In some embodiments, the network module 112 is configured to transmit an encoded data corresponding to the message.

Figure 2:
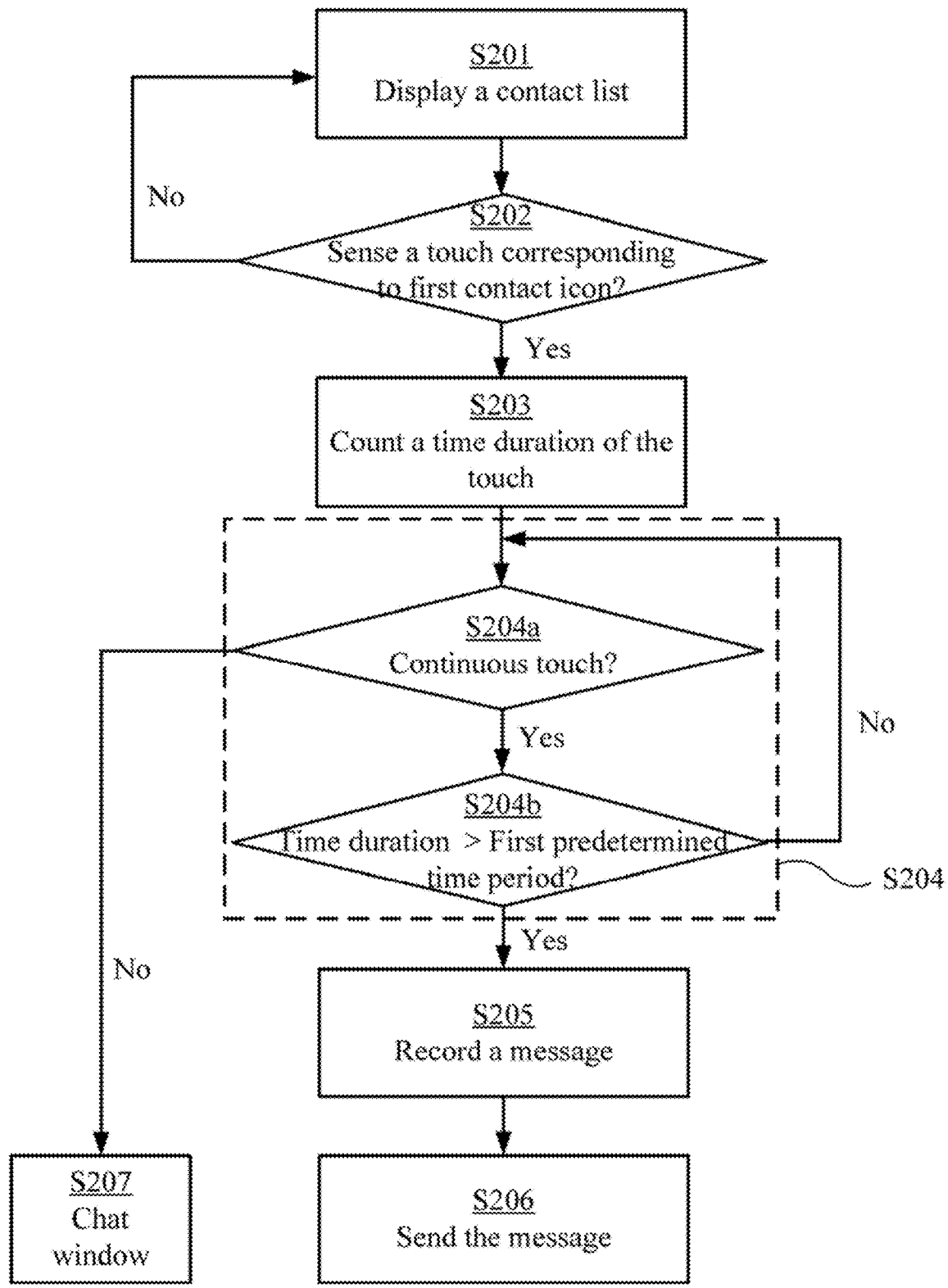
FIG. 2 is a flow diagram illustrated a messaging method according to one embodiment of this disclosure.

Reference is also made to FIG. 2, which is a flow diagram of a messaging method 200 according to one embodiment of this disclosure is illustrated. The processing module 102 performs the messaging method 200 by executing one or more sequences of instructions corresponding to a program code stored in the storage module 104.

In step S201, the display module 108 displays a contact list including at least one contact icon, in which the contact icon corresponds to contact information of a contact or of a group of contacts.

In some embodiments, the contact list may be a chat history list or a favorite contact list.

In step S202, the touch-sensitive module 106 senses a first touch corresponding to one of the contact icons (i.e., a first contact icon) displayed on the display module 108 while a first application program is executed on the electronic device. If the first touch on the first contact icon is detected, a touch signal is fed back to the processing module 102, and the flow goes to step S203. If no touch is detected, the flow goes to step S201. The first application program in this embodiment is an instant messaging program, a contact list program, or any social networking program which involves/records the contact information (emails, personal identifications, instant messaging accounts) of users, and the contact icons are icons displayed on the user interface of the first application program.

In some embodiments, the touch-sensitive module 106 may sense multiple touches corresponding to multiple contact icons displayed on the display module 108, and touch signals are fed back to the processing module 102 if the touches on the multiple contact icons are detected.

In step S203, the processing module 102 receives the touch signal corresponding to the first touch on the first contact icon, and the processing module 102 begins counting a time duration of the first touch.

In step S204, the touch-sensitive module 106 detects whether the first touch is continuous on the first contact icon and whether the time duration of the first touch exceeds a first predetermined time period. In step 204a, if the first touch is released, the flow goes to step S207. If the first touch is continuous on the first contact icon, the flow goes to step S204b. In step S204b, the processing module 102 determines whether the time duration exceed the first predetermined time period. If the time duration does not exceed the first predetermined time period, the processing module 102 keeps counting the time duration of the first touch, and the flow stays in step S204. If the time duration exceeds the first predetermined time period, the flow goes to step S205.

In some embodiments, operations of the step S204a and step S204b may be implemented simultaneously. For example, a first index is set to be valid by the processing module 102 when the touch-sensitive module 106 detects that the first touch is continuous on the first contact icon, and a second index is set to be valid by the processing module 102 when the time duration of the first touch exceeds the first predetermined time period, in which the first index and the second index are configured to determine states of the first touch. Accordingly, in step S204, when the first index is invalid, the flow goes to step S207. If the first index and the second index are valid and invalid respectively, the flow stays in step S204. If the first index and the second index are both valid, the flow goes to step S205.

In some embodiments, if the time duration exceeds the first predetermined time period, the first contact icon is highlighted, and the other contact icons (i.e., second contact icons) of the contact list is dimmed.

In some embodiments, a timer in the electronic device 100 may count the time duration of the first touch.

In step S205, the processing module 102 sends at least one control signal to the input module 210 so as to record a message. The type of the message may be predetermined by a user or be defaulted as one of the voice message, the audio message, the video message and the text message.

In some embodiments, the text message is converted from another voice message by a voice recognition program. The voice recognition program may be stored in the storage module 104 and be executed by the processing module 102.

In some embodiments, the message is continuously recorded and the time duration is continuously counted until the touch-sensitive module 106 detects that the first touch is released. That is, when the first touch is released, the time duration is no longer counted, and a recording time duration of the message becomes the time duration of the first touch minus the first predetermined time period.

In some embodiments, the message is continuously recorded until the time duration exceeds a second predetermined time period, which means that the recording time duration of the message is the second predetermined time period minus the first predetermined time period.

In some embodiments, the message is recorded until the touch-sensitive module 106 detects another touch corresponding to a confirm icon displayed on the display module 108, or when the processing module 102 detects a press on a physical button of the electronic device 100. It should be understood that the time duration of the first touch is no longer counted when the message is confirmed. Accordingly, the recording time duration of the message is the time duration of the first touch minus the first predetermined time period.

In step S206, when the message is recorded completely by the input module 110, the processing module 102 sends at least one control signal to the network module 112 so as to send the message according to contact information corresponding to the first contact icon.

In some embodiments, the message is sent when the touch-sensitive module 106 detects that the first touch is released.

In some embodiments, the message is sent when the time duration exceeds the second predetermined time period.

In some embodiments, the message is sent when the touch-sensitive module 106 detects another touch corresponding to a confirm icon on the display module 108, or when the processing module 102 detects a press on a physical button of the electronic device 100.

In step S207, the display module 108 displays a chat window corresponding to the first contact icon.

In some embodiments, when the touch-sensitive module 106 senses multiple touches corresponding to multiple contact icons displayed on the display module 108, the messaging method 200 is also suitable for the touches. For example, when multiple touches on different contact icons are simultaneously detected by the touch-sensitive module 106, the processing module 102 begins counting plural time durations of the multiple touches. When each of the plural time durations exceeds the first predetermined time, the input module 110 is configured to record the message. Once the message is recorded completely, the message is sent according to the contact information corresponding to the contact icons where the touches locate.

Based on the aforesaid embodiments, the electronic device 100 and the messaging method 200 provide a more intuitional operation for users to send the message. Reference is now made to FIGS. 3A-5D for illustrating multiple embodiments of the disclosure.

Figure 3C:
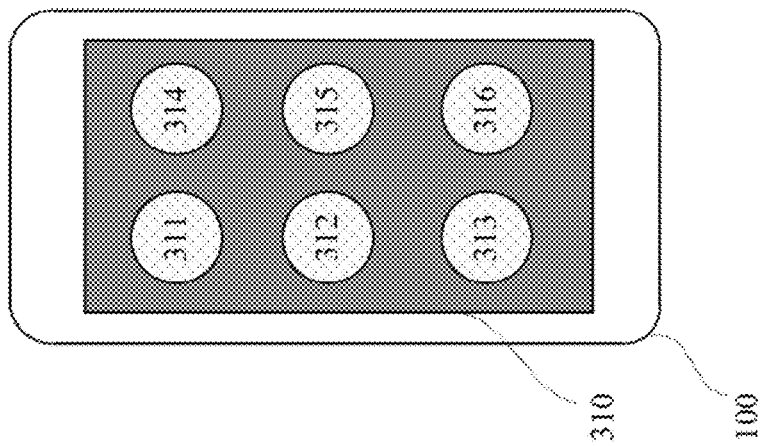
FIGS. 3A-3C are a series of operation flow diagrams of the electronic device according to one embodiment of this disclosure.
Figure 3B:
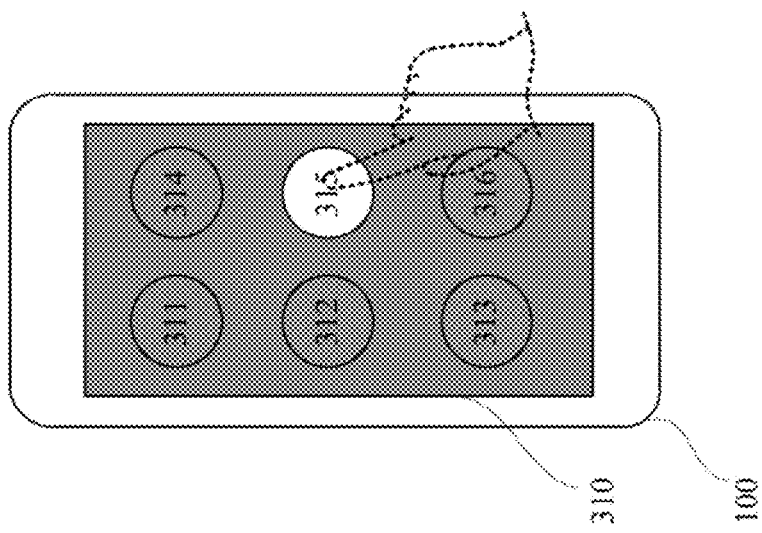
Figure 3A:
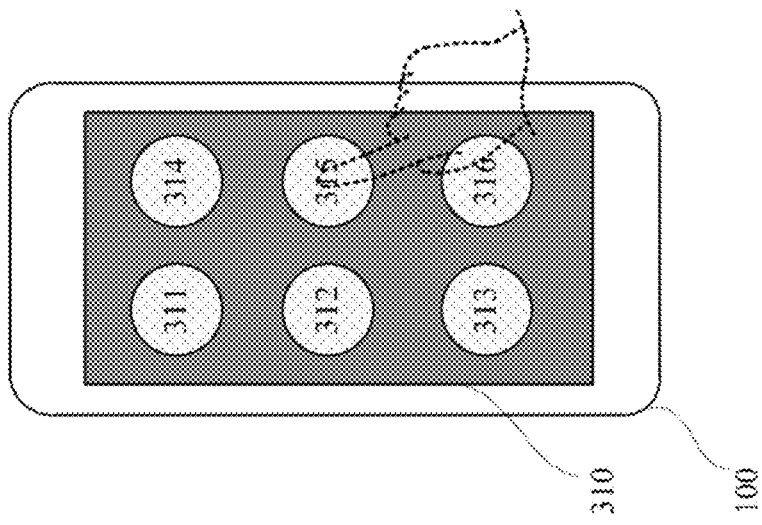

Referring to FIGS. 3A-3C, a series of operation flow diagrams of the electronic device 100 according to one embodiment of this disclosure are illustrated. In the present embodiment, the display module 108 and the touch-sensitive module 106 are integrated into a touch display panel 310. The touch display panel 310 displays a plurality of contact icons 311-316.

In some embodiments, the touch-sensitive module 106 and the display module 108 may be modules separately disposed in the electronic device 100. For example, a touch pad and a display screen are separately disposed in a notebook.

As shown in FIG. 3A, a user touches the contact icon 315 on the touch display panel 310, and the processing module 102 is configured to begin counting a time duration of the touch.

Afterward, as shown in FIG. 3B, when the time duration of the touch exceeds a first predetermined time period, the contact icon 315 is highlighted, the remaining contact icons 311-314 and 316 are dimmed, and the input module 110 of the electronic device 100 begins recording a message.

In some embodiments, when the time duration of the touch first exceeds the first predetermined time period, the touch display panel 310 displays a notification for a third predetermined time period, e.g.; 1 second. When the third predetermined time period is reached, the input module 110 begins recording the message.

In some embodiments, when the time duration of the touch first exceeds the first predetermined time period, a speaker module of the electronic device 100 outputs a notification sound for a fourth predetermined time period, e.g., 0.5 seconds. When the fourth predetermined time period is reached, the input module 110 begins recording the message.

In some embodiments, when the time duration of the touch first exceeds the first predetermined time period, a vibration module of the electronic device 100 vibrates for a fifth predetermined time period, e.g., 0.5 seconds. When the fifth predetermined time period is reached, the input module 110 begins recording the message.

Subsequently, as shown in FIG. 3C, the touch is released. When the touch display panel 310 detects that the touch is released, the time duration is no longer counted, and the message is recorded completely and sent according to the contact information corresponding to the contact icon, in which a recording time duration of the message is the time duration of the touch minus the first predetermined time period. Meanwhile, the contact icons 311-316 are reset to their original state. In the present embodiment, the contact icon 315 is no longer highlighted, and the remaining contact icons 311-314 and 316 are no longer dimmed.

Referring to FIGS. 4A-4D, a series of operation flow diagrams of the electronic device 100 according to one embodiment of this disclosure are illustrated. In the present embodiment, the display module 108 and the touch-sensitive module 106 are also integrated into a touch display panel 310. The touch display panel 310 displays a plurality of contact icons 411-416.

As shown in FIG. 4A, a user touches the contact icon 415 on the touch display panel 310, and the processing module 102 of the electronic device 100 is configured to begin counting a time duration of the touch on the contact icon 415.

Afterward, as shown in FIG. 4B, when the time duration of the touch exceeds a first predetermined time period, the contact icon 415 is highlighted, the remaining contact icons 411-414 and 416 are dimmed by the processing module 102, and the input module 110 of the electronic device 100 begins recording a message.

Subsequently, as shown in FIG. 4C, the touch is released. When the touch display panel 310 detects that the touch is released, the input module 110 stops recording the message, and the time duration of the touch is no longer counted. In other words, the message is recorded completely, and a recording time duration of the message is the time duration minus the first predetermined time period. Meanwhile, the contact icon 415 acts as a confirmation icon.

Finally, as shown in FIG. 4D, the touch display panel 310 detects that the contact icon 415 (acting as the confirmation icon) is pressed by the user for confirming the message, and the message is sent according to contact information corresponding to the contact icon 415.

Referring to FIGS. 5A-5D, a series of operation flow diagrams of the electronic device 100 according to one embodiment of this disclosure are illustrated. In the present embodiment, the display module 108 and the touch-sensitive module 106 are also integrated into a touch display panel 310. The touch display panel 310 displays a plurality of contact icons 511-516.

As shown in FIG. 5A, a user touches the contact icon 515 on the touch display panel 310, and the processing module 102 is configured to begin counting a time duration of the touch on the contact icon 515.

Afterward, as shown in FIG. 5B, when the time duration of the touch exceeds the first predetermined time period, the contact icon 515 is highlighted, the remaining contact icons 511-514 and 516 are dimmed, and the input module 110 of the electronic device 100 begins recording a message.

Subsequently, as shown in FIG. 5C, the touch is released. Compared to the state in FIG. 4C, the input module 110 of the electronic device 100 in FIG. 5C keeps recording the message. In other words, the message is continuously recorded. Meanwhile, the contact icon 515 acts as a confirmation icon.

Finally, as shown in FIG. 5D, the touch display panel 310 detects that the contact icon 515 (the confirmation icon) is pressed by the user for confirming the message, and the message is recorded completely and sent according to contact information corresponding to the contact icon 515, in which a recording time duration of the message is the time duration minus the first predetermined time period.

The messaging method 200 in aforesaid embodiments is utilized to send out a message in a quick and intuitional way. The users can easily send their message without complex operations (e.g., searching for target in a contact list, selecting the target, calling out a virtual keyboard, typing on the virtual keyboard, clicking on the sending button, etc.). However, the messaging method 200 in this disclosure is not limited to send the message out.

Figure 6:
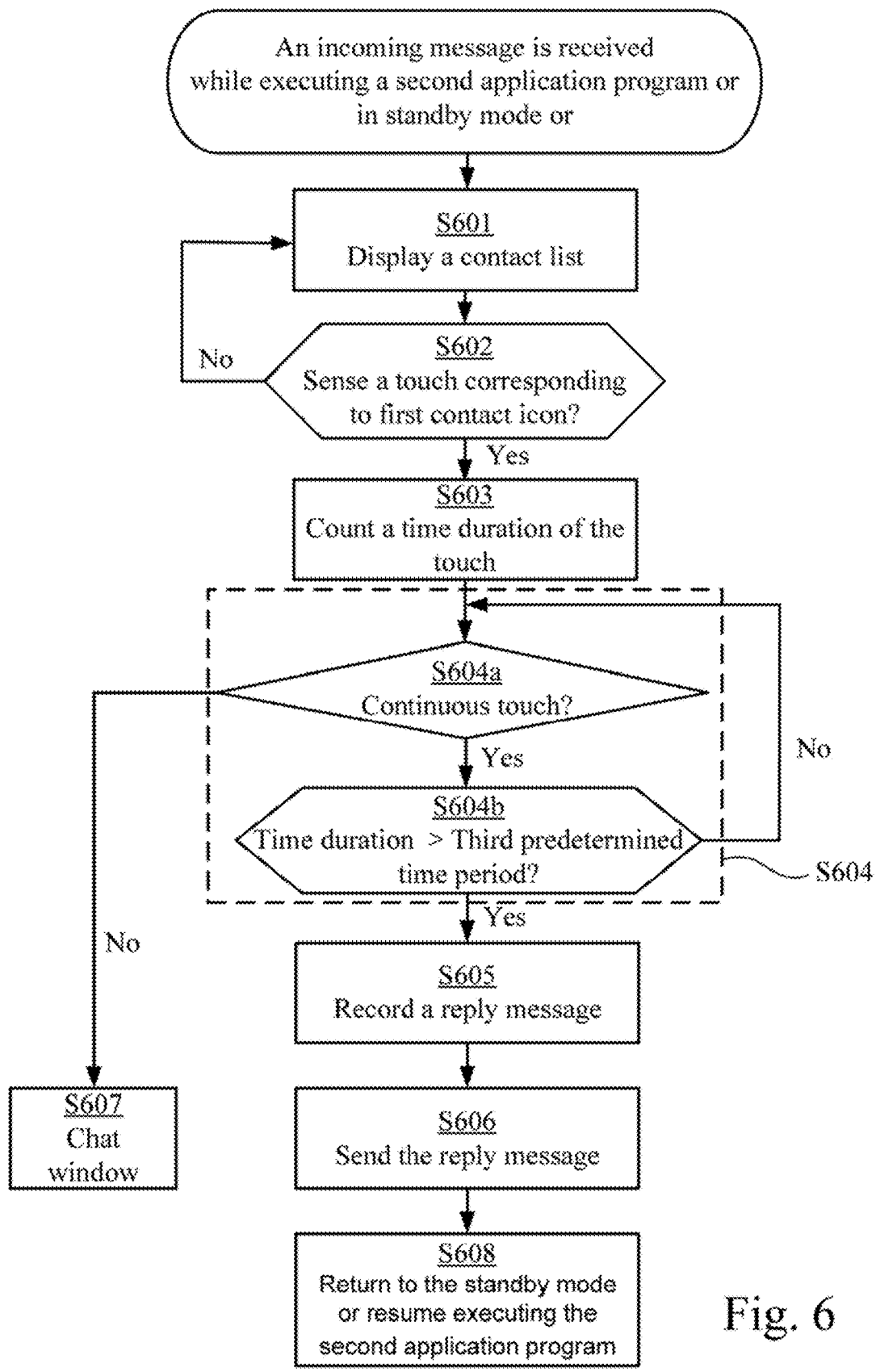
FIG. 6 is a flow diagram illustrating further steps of the messaging method according to one embodiment of this disclosure.

Reference is also made to FIG. 6, which is a flow diagram illustrating further steps of the messaging method 200 according to one embodiment of this disclosure. The processing module 102 performs the messaging method 600 by executing one or more sequences of instructions corresponding to a program code stored in the storage module 104. Further steps of the messaging method 200 shown in FIG. 6 are related to quickly reply the incoming message.

As shown in FIG. 6, in response to an incoming message is received by the electronic device 100 while the electronic device 100 is in a standby mode (e.g., the display module 108 is turned off or dimmed down) or currently executing a second application program, steps S601-S606 are executed to reply the incoming message. In this embodiments, the second application program different from the first application program. For example, the second application program can be any application program on the electronic device other than the instant messaging program (i.e., the first application program).

Reference is also made to FIG. 7A to FIG. 7D, which are a series of schematic diagrams illustrating user interfaces on the touch display panel 310 of the electronic device 100 according to one embodiment of this disclosure.

Figure 7:
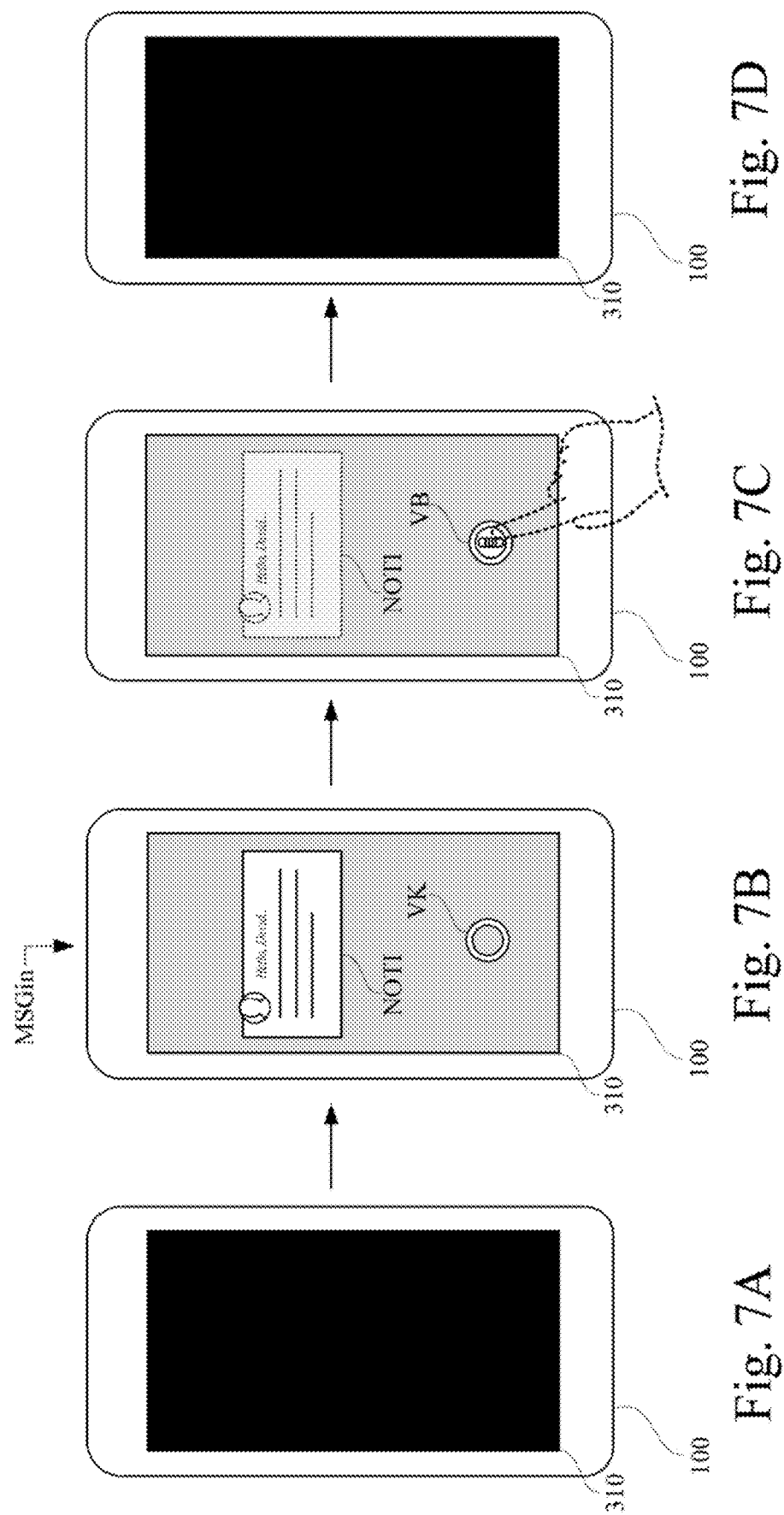
FIGS. 7A-7D are a series of schematic diagrams illustrating user interfaces on the touch display panel of the electronic device according to one embodiment of this disclosure.

As shown in FIG. 7A, the electronic device 100 is in a standby mode. In this case, the touch display panel 310 is turned off (or dimmed down).

In response to the incoming message MSGin is received, step S601 is executed to display a notification NOTI for indicating the incoming message MGGin on the display module (i.e., the touch display panel 310) of the electronic device 100 as shown in FIG. 7B. The incoming message MSGin can be an instant message sent from another electronic device to the electronic device 100. The notification NOTI shows text/image/voice/video contents of the incoming message MSGin and/or a thumbnail image of the original sender.

In some embodiments, the incoming message may be received directly by the electronic device 100 (e.g., the wearable device, portable device or accessory). In some embodiments, the incoming message MSGin may be first received by another mobile device, and the mobile device sent the incoming message to the electronic device 100 through a short-range communication network (e.g., Bluetooth).

Step S602 is executed for sensing a second touch (as shown in FIG. 7C) corresponding to the notification NOTI displayed on the touch display panel 310. In this embodiment, there is a virtual button VB displayed on the touch display panel 310. If the user tends to reply the incoming message MSGin, the user can touch and hold on the virtual button VB. In some other embodiments, the touch on the virtual button VB can be replaced on a manipulation on a physical button. Step S602 is executed for sensing the second touch (on the virtual button VB) corresponding to the notification NOTI displayed on the touch display panel 310.

In some embodiments, the user can remove the notification NOTI by sliding down on the screen of the electronic device 100, such that the notification NOTI on the electronic device 100 can be removed.

As shown in FIG. 6 and FIG. 7C, step S603 is executed for counting a time duration of the second touch on the virtual button VB corresponding to the notification NOTI.

In step S604, the touch-sensitive module 106 (i.e., the touch display panel 310) detects whether the second touch is continuous on the virtual button VB and whether the time duration of the second touch exceeds a third predetermined time period. In step S604a, if the second touch is released, the flow goes to step S607. If the second touch is continuous on the virtual button VB, the flow goes to step S604b. In step S604b, the processing module 102 determines whether the time duration exceeds the third predetermined time period. If the time duration does not exceed the third predetermined time period, the processing module 102 keeps counting the time duration of the second touch, and the flow stays in step S604. If the time duration exceeds the third predetermined time period, the flow goes to step S605.

In step S605, the processing module 102 sends at least one control signal to the input module 210 so as to record a reply message. The details of step S605 is similar to step S605 of recording the message in aforesaid embodiments.

In some embodiments, the reply message is continuously recorded and the time duration is continuously counted until the touch-sensitive module 106 detects that the second touch is released.

In some embodiments, the message is continuously recorded until the time duration exceeds a fourth predetermined time period. Recording time duration of the reply message is the third predetermined time period minus the fourth predetermined time period.

In some embodiments, the message is recorded until the touch-sensitive module 106 detects another touch corresponding to a confirm icon displayed on the display module 108, or when the processing module 102 detects a press on a physical button of the electronic device 100. It should be understood that the time duration of the first touch is no longer counted when the message is confirmed.

In step S606, in response to the reply message is recorded, the processing module 102 sends at least one control signal to the network module 112 so as to send the reply message according to contact information corresponding to the incoming message MSGin. Therefore, the reply message can be sent to the original sender of the incoming message MSGin.

In response to the reply message is sent in step S606, step S608 is executed such that the electronic device 100 returns to the standby mode or resumes executing the second application program (before the incoming message MSGin is received).

In step S607, the display module 108 (i.e., the touch display panel 310) displays a chat window corresponding to the incoming message MSGin.

From the features above, a reply of the message to the contact sending the message is easily achieved without complicated procedures. In some embodiments, the reply message is compared with voiceprints before sending out the reply message. In some embodiments, the long press (i.e., the second touch) is compared with fingerprints before sending out the reply message. In this case, the long press (i.e., the second touch) is manipulated on a physical button having a function of fingerprint identification.

In some embodiments, the reply message is compared with voiceprints, and the long press is compared with fingerprints before sending out the reply message, in which the two comparisons mentioned may be implemented on the electronic device or mobile device.

The messaging methods mentioned in embodiments may take the form of a program code stored on a computer-readable storage medium having computer-readable instructions embodied in the medium. Any suitable storage medium (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

Based on the aforesaid embodiments, the operation of the electronic device and the messaging method does not only become more intuitional but also requires fewer steps for sending the message.

Figure 8:
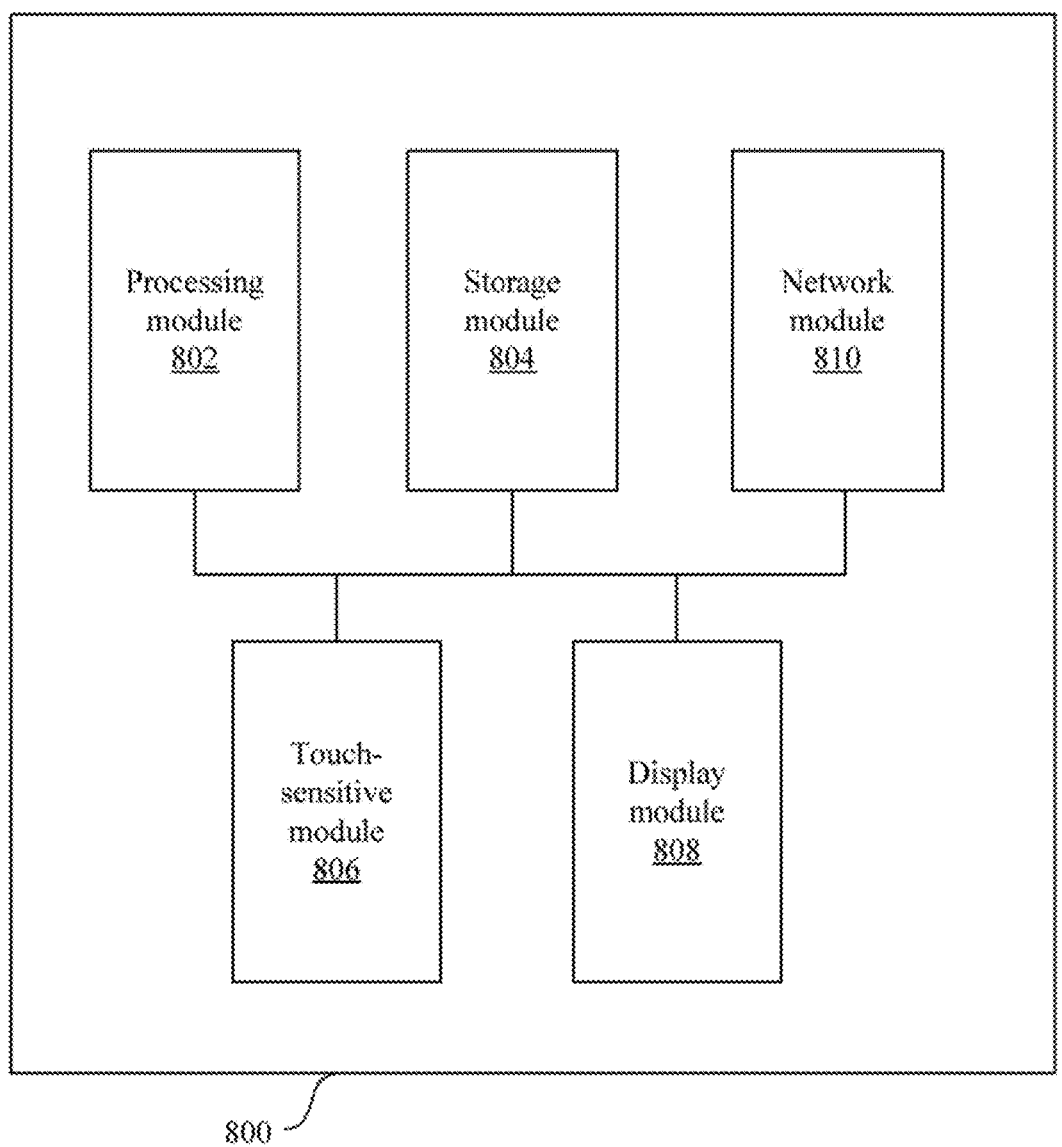
FIG. 8 is a schematic diagram illustrating an electronic device according to one embodiment of this disclosure.

Referring to FIG. 8, FIG. 8 is a schematic diagram illustrating an electronic device 800 according to one embodiment of this disclosure. The electronic device 800 includes a processing module 802, a storage module 804, a touch-sensitive module 806, a display module 808 and a network module 810. The processing module 802, the storage module 804, the touch-sensitive module 806, the display module 808 and the network module 810 are electrically coupled with each other.

The processing module 802 comprises at least one processor. The processor is configured to load and execute at least one program code from the storage module 804. In addition, the processing module 802 is configured to receive signals transmitted from the touch-sensitive module 806, and the processing module 802 is also configured to transmit signals to the touch-sensitive module 806 and the display module 808 respectively.

In some embodiments, the processing module 802 is configured to load and execute another program code from an externally connected device.

The storage module 804 is configured to store at least one program code, in which the program code includes one or more sequences of instructions.

The touch-sensitive module 806 is configured to sense at least one touch and to transmit a touch signal corresponding to the touch to the processing module 802. The touch signal may include a position of the touch.

The display module 808 is configured to display images or videos according to display signals transmitted from the processing module 802.

In some embodiments, the display module 808 and the touch-sensitive module 806 may be integrated into a touch-sensitive display unit, in which the touch-sensitive display unit may be a touch display panel.

The network module 810 is configured to transmit or receive data through a wireless or wired network.

Figure 9:
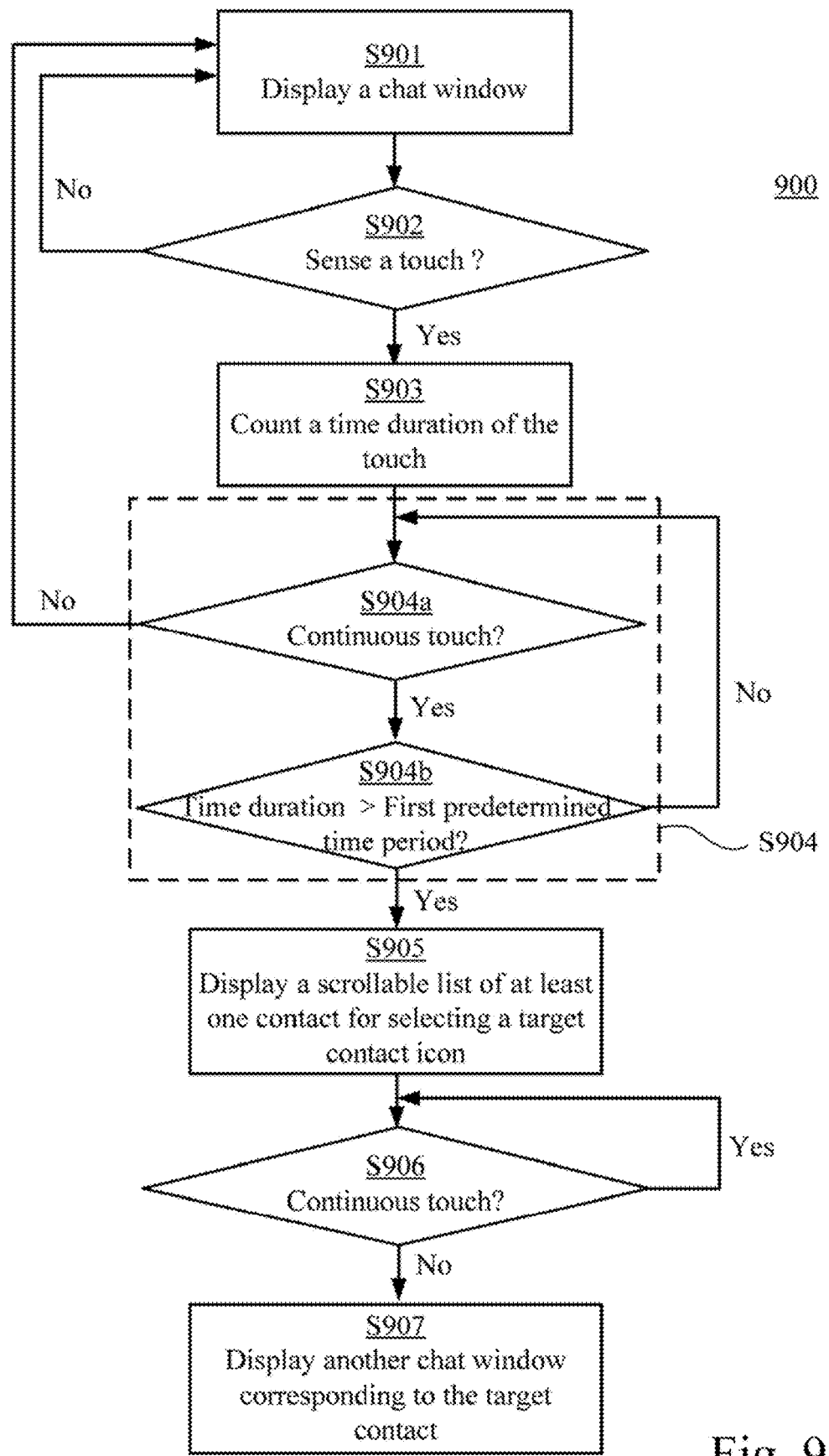
FIG. 9 is a flow diagram illustrated a display switching method according to one embodiment of this disclosure.

Referring also to FIG. 9, a flow diagram of a display switching method 900 according to one embodiment of this disclosure is illustrated. The processing module 802 performs the display switching method 900 by executing one or more sequences of instructions corresponding to a program code stored in the storage module 804.

In step S901, the display module 808 displays an original chat window corresponding to an original contact icon, in which the original contact icon corresponds to a contact or a group of contacts.

In step S902, the touch-sensitive module 806 senses whether a touch is on the touch-sensitive module 806. If the touch-sensitive module 806 senses no touches, the flow goes to step S901 to display the original chat window. If the touch-sensitive module 806 senses that the touch is on the touch-sensitive module 806, a touch signal is fed back to the processing module 802, and the flow goes to step S903.

In some embodiments, when the display module 808 displays the original chat window, the original chat window includes an original contact icon displayed on the display module 808. The touch-sensitive module 806 only senses the touch which is on a position of the touch-sensitive module 806 not corresponding to the original contact icon.

In step S903, the processing module 802 receives the touch signal corresponding to the touch, and the processing module 802 begins counting a time duration of the touch.

In step 904, the touch-sensitive module 806 detects whether the touch remains on the touch-sensitive module 806 and whether the time duration of the touch exceeds a first predetermined time period. In step 904*a*, if the touch is released from the touch-sensitive module 806, the flow goes back to step S901. If the touch is continuous on the touch-sensitive module 806, the flow goes to step S904*b*. In step S904*b*, the processing module 802 determines whether the time duration of the touch exceeds the first predetermined time period. If the time duration does not exceed the first predetermined time period, the processing module 802 keeps counting the time duration of the touch, and the flow stays in step S904. If the time duration exceeds the first predetermined time period, the flow goes to step S905.

In some embodiments, operations of the step S904a and step S904b may be implemented simultaneously. For example, a first index is set to be valid by the processing module 802 when the touch-sensitive module 806 detects that the touch is continuous, and a second index set to be valid by the processing module 802 when the time duration of the touch exceeds the first predetermined time period, in which the first index and the second index are configured to determine states of the touch. Accordingly, in step S904, when the first index is invalid, the flow goes to step S901. If the first index and the second index are valid and invalid respectively, the flow stays in step S904. If the first index and the second index are both valid, the flow goes to step S905.

In some embodiments, a timer in the electronic device 800 may count the time duration of the touch.

In step S905, the display module 808 displays a list of at least one contact icon for selecting a target contact icon, in which the list is shown in a vertical format, a horizontal format, a diagonal format or a matrix format, and the list is scrollable in a vertical direction, a horizontal direction, a diagonal direction or 2-dimensional direction. In the present embodiment, the target contact is located at the center of the list. For example, if the list including multiple contact icons is shown in a vertical format, the target contact icon is a central contact icon of list.

In some embodiments, each contact icon may correspond to a frequent contact, a frequent group of contacts, a recent contact, a recent group of contacts, a favorite contact or a favorite group of contacts.

In some embodiments, the center of the list is displayed at the center of the display module 808, on a first position of the display module 808 corresponding to where the touch is first sensed or on a second position of the display module 808 corresponding to where the touch is sensed when the time duration of the touch is equal to the first predetermined time period.

In some embodiments, the screen of the display module is divided into a plurality of intervals along a 2-dimensional direction, and the list is scrolled according to the movement corresponding to the touch across the intervals.

In some embodiments, the list is scrolled automatically in a certain speed.

In step S906, if the touch-sensitive module 806 senses that the touch is continuous on the touch-sensitive module 806, the flow stays in the step S906. If the touch-sensitive module 806 senses that the touch is released from the touch-sensitive module 806, the flow goes to step S907. In other words, in step S906, when the touch is continuous on the touch-sensitive module 806, the touch is configured to select the target contact icon. On the other hand, when the touch is released, the central contact icon of the at least one contact icon in the list is selected as the target contact icon.

In step S907, the display module 808 displays another chat window corresponding to the target contact icon.

Based on the aforesaid embodiments, the electronic device 800 and the messaging method 900 provide a more intuitional operation for users to switch between different contact windows.

Reference is now made to FIGS. 10A-12E for illustrating more embodiments of the disclosure. Referring to FIGS. 10A-10E, a series of operation flow diagrams of the electronic device 800 according to one embodiment of this disclosure are illustrated. In the present embodiment, the display module 808 and the touch-sensitive module 806 are integrated into a touch display panel 812.

In some embodiments, the touch-sensitive module 806 and the display module 808 may be modules separately disposed in the electronic device 800. For example, a touch pad and a display screen are separately disposed in a notebook.

Figures 10A, 10B, 10C, 10D, 10E:
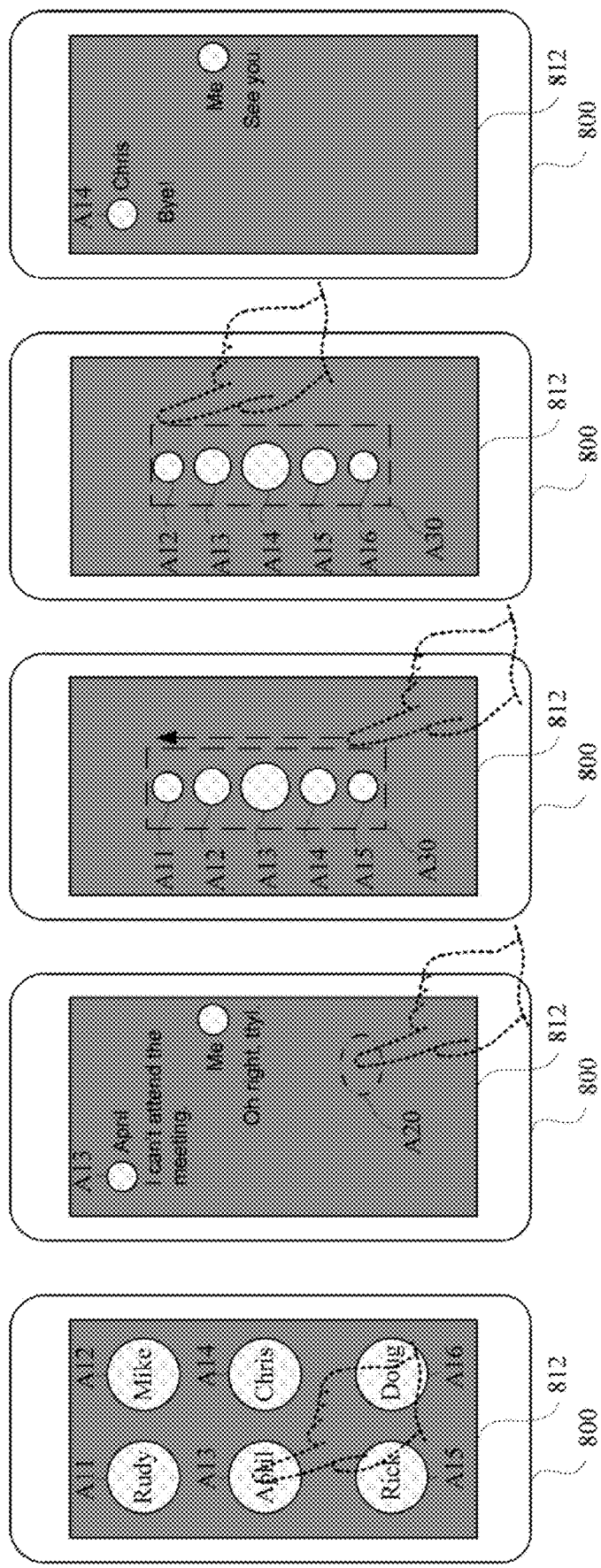
FIGS. 10A-10E are a series of operation flow diagrams of the electronic device according to one embodiment of this disclosure.

In FIG. 10A, the touch display panel 812 displays a plurality of contact icons A11-A16, and the touch display panel 812 senses a touch on the contact icon A13 from a user.

Subsequently, in FIG. 10B, the touch display panel 812 displays a chat window corresponding to the contact icon A13. The touch display panel 812 senses a touch on a position A20 of the touch display panel 812, and the processing module 802 of the electronic device 800 begins counting a time duration of the touch on the position A20 of the touch display panel 812.

When the time duration of the touch on the position A20 exceeds the first predetermined time period, the chat window corresponding to the contact icon A13 is dimmed, and the touch display panel 812 displays a scrollable list A30 of contact icons A11-A15 for selecting a target contact icon as shown in FIG. 10C, in which the scrollable list A30 is show in a vertical format. In the present embodiment, the contact icon A13 corresponding to the chat window shown in FIG. 100, is displayed at the center of the scrollable list A30.

As shown in FIG. 10C, the touch from the user is moving up so as to select the target contact icon. In the present embodiment, the movement of the contact icons in the scrollable list A30 is in a same direction of the movement corresponding to the touch.

Accordingly, in FIG. 10D, the central contact icon of the scrollable list. A30 becomes the contact icon A14 due to the movement of the touch. In other words, the target contact icon becomes the contact icon A14.

At last, in FIG. 10E, since the touch display panel 812 senses that the touch is released by the user, the touch display panel 812 displays a contact window corresponding to the target contact icon, i.e., contact icon A14.

Referring to FIGS. 11A-11E, a series of operation flow diagrams of the electronic device 800 according to one embodiment of this disclosure are illustrated. In the present embodiment, the display module 808 and the touch-sensitive module 806 are also integrated into a touch display panel 812.

Figure 11A:
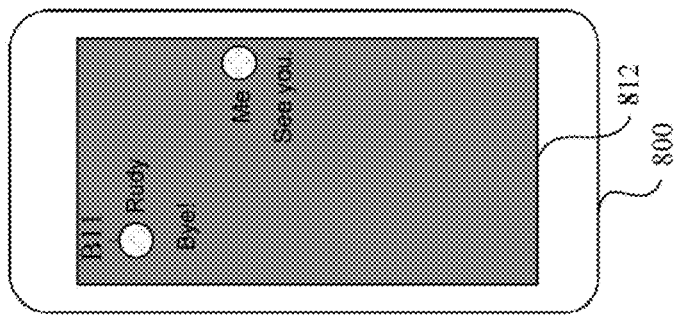
FIGS. 11A-11E are a series of operation flow diagrams of the electronic device according to one embodiment of this disclosure.

In FIG. 11A, the touch display panel 812 displays a plurality of contact icons B11-B16, and the touch display panel 812 is configured to sense one or more touches. In the present embodiment, when the touch display panel 812 senses a touch on the contact icon B13, the touch display panel displays a chat window as shown in FIG. 11B.

Figure 11B:
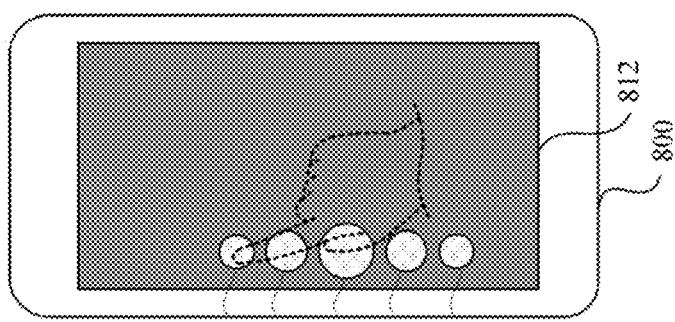

In FIG. 11B, the touch display panel 812 displays the chat window corresponding to the contact icon B13. Later, the touch display panel 812 senses a touch on a position B20 of the touch display panel 812, and the processing module 802 of the electronic device 800 begins counting a time duration of the touch on the position B20 of the touch display panel 812. When the time duration of the touch on the position B20 exceeds the first predetermined time period, the chat window shown in FIG. 11B is dimmed, and a scrollable list B30 is shown as in FIG. 11C, in which the scrollable list B30 is show in a vertical format.

Figure 11C:
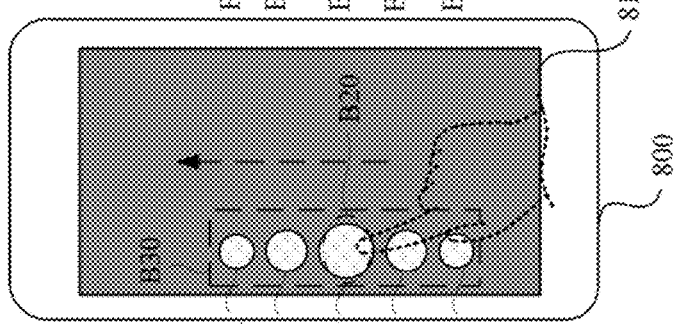

In FIG. 11C, the center of the scrollable list B30 is displayed on the position B20 where the touch locates, in which the scrollable list B30 is configured to be scrolled for selecting a target contact. Meanwhile, the user remains the touch on the touch-display module 812 and moves toward the top of the touch-display module 812. In the present embodiment, the movement of the contact icons in the scrollable list B30 is in an opposite direction of the movement corresponding to the touch.

Figure 11D:
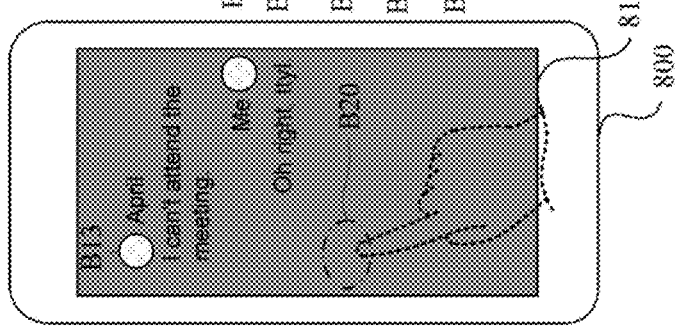

Accordingly, in FIG. 11D, the central contact icon of the scrollable list B30 becomes the contact icon B11 due to the movement of the touch. In other words, the target contact icon becomes the contact icon B11. In the present embodiment, the scrollable list B30 also includes contact icons B17 and B18, in which each contact icon B17 and B18 corresponds to a contact or a group of contacts.

Figure 11E:
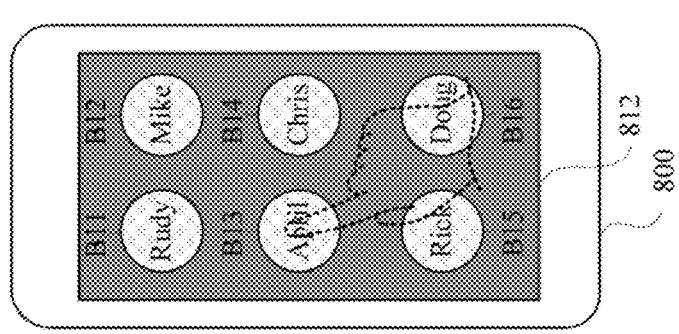

At last, since the touch display panel 812 senses that the touch is released by the user, the touch display panel 812 displays a contact window corresponding to the target contact icon, i.e., contact icon B11, as shown in FIG. 11E.

Referring to FIGS. 12A-12E, a series of operation flow diagrams of the electronic device 800 according to one embodiment of this disclosure are illustrated. In the present embodiment, the display module 808 and the touch-sensitive module 806 are also integrated into a touch display panel 812.

In FIG. 12A, the touch display panel 812 displays a plurality of contact icons C11-C16, and the touch display panel 812 is configured to sense one or more touches. In the present embodiment, when the touch display panel 812 senses a touch on the contact icon C13, the touch display panel displays a chat window as shown in FIG. 12B.

In FIG. 12B, the touch display panel 812 displays the chat window corresponding to the contact icon C13. The touch display panel 812 senses a touch on a position 520 of the touch display panel 812, and the processing module 802 of the electronic device 800 begins counting a time duration of the touch on the position 520 of the touch display panel 812. When the time duration of the touch on the position 520 exceeds the first predetermined time period, the chat window shown in FIG. 12B is dimmed, and a scrollable list 530 is shown as in FIG. 12C, in which the scrollable list A30 is show in a horizontal format.

As shown in FIG. 12C, the center of the scrollable list 530 is displayed at the center of the touch display panel 812. Meanwhile, the user remains the touch on the touch-display module 812 and moves toward the right of the touch-display module 812. In the present embodiment, the movement of the contact icons in the scrollable list 530 is in a same direction of the movement corresponding to the touch.

Accordingly, in FIG. 12O, the contact icon at the center of the scrollable list 520 becomes the contact icon C11 due to the movement of the touch on the touch display module 812. In other words, the target contact icon becomes the contact icon C11.

At last, in FIG. 12E, since the touch display panel 812 senses that the touch is released by the user, the touch display panel 812 displays a contact window corresponding to the target contact icon, i.e., contact icon C14.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is interred that the present disclosure cover modifications and variations of this disclosure provided they fall within the scope of the following claims.

What is claimed is:

1. An electronic device, comprising:
   at least one processor;
   a touch-sensitive module;
   a display module; and
   a non-transitory computer-readable medium comprising one or more sequences of instructions to be executed by the processor for performing a messaging method, comprising:
   sensing a plurality of first touches corresponding to a plurality of first contact icons displayed on the display module while a first application program is executed on the electronic device;
   counting respectively a plurality of first time durations that the plurality of first touches are continuous on the plurality of first contact icons;
   recording a message in response to the plurality of first time durations, when during the plurality of first touches are continuous on the plurality of first contact icons, exceeds a first predetermined time period; and
   sending the message according to contact information corresponding to the plurality of first contact icons when the plurality of first touches on the plurality of first contact icons are released,
   wherein the message is continuously recorded until the touch-sensitive module detects that the plurality of first touches on the plurality of first contact icons are released;
   wherein in response to an incoming message is received by the electronic device while the electronic device is in a standby mode or currently executing a second application program different from the first application program, the messaging method further comprising:
   displaying a notification for indicating the incoming message on the display module;
   displaying a virtual button on the display module, wherein the virtual button is touch-activated to effect recording of a message to respond to the incoming message;
   sensing a second touch corresponding to the virtual button displayed on the display module;
   counting a second time duration of the second touch;
   recording a reply message in response to the second time duration exceeds a third predetermined time period; and
   sending the reply message according to contact information corresponding to the incoming message.

2. The electronic device of claim 1, wherein the step of sending the message further comprises:
   sending the message when the touch-sensitive module detects that the plurality of first touches are released, when the plurality of first time durations exceeds a second predetermined time period, when the touch-sensitive module detects another touch corresponding to a confirm icon on the display module, or when the processor detects a press on a physical button of the electronic device.

3. The electronic device of claim 1, wherein the display module further displays at least one second contact icon, and the step of recording the message further comprises:
   highlighting the first contact icon and dimming the second contact icon when the plurality of first time durations exceed the first predetermined time period.

4. The electronic device of claim 1, wherein the first contact icon corresponds to a contact or a group of contacts, and the first contact icon is shown in a chat history list, a contact list or a favorite contact list.

5. The electronic device of claim 1, wherein the message is a voice message, an audio message, a video message, an image message or a text message.

6. The electronic device of claim 5, wherein the text message is converted from another voice message by a voice recognition program.

7. The electronic device of claim 1, wherein in response to the reply message is sent, the electronic device returns to the standby mode or resumes executing the second application program.

8. The electronic device of claim 1, wherein the second time duration is that of the second touch being continuous on the virtual button.

9. The electronic device of claim 1, wherein the reply message is continuously recorded until the second touch is released, a fourth predetermined time period is exceeded, another touch corresponding to a confirm icon displayed on the display module is detected, or pressing of a physical button of the electronic device is detected.

10. The electronic device of claim 1, wherein the notification shows contents of the incoming message.

11. A messaging method, suitable for an electronic device, comprising:
sensing a plurality of first touches corresponding to a plurality of first contact icons displayed on a display module of the electronic device while a first application program is executed on the electronic device;
counting a plurality of first time durations that the plurality of first touches are continuous on the plurality of first contact icons;
recording a message in response to the plurality of first time durations, when during the plurality of first touches are continuous on the plurality of first contact icons, exceeds a first predetermined time period; and
sending the message according to contact information corresponding to the plurality of first contact icons when the plurality of first touches on the plurality of first contact icons are released,
wherein the message is continuously recorded until the plurality of first touches on the plurality of first contact icons are detected to be released;
wherein in response to an incoming message is received by the electronic device while the electronic device is in a standby mode or currently executing a second application program different from the first application program, the messaging method further comprising:
displaying a notification for indicating the incoming message on the display module;
displaying a virtual button on the display module, wherein the virtual button is touch-activated to effect recording of a message to respond to the incoming message;
sensing a second touch corresponding to the virtual button displayed on the display module;
counting a second time duration of the second touch;
recording a reply message in response to the second time duration exceeds a third predetermined time period; and
sending the reply message according to contact information corresponding to the incoming message.

12. The messaging method of claim 11, wherein step of sending the message further comprises:
sending the message in response to the plurality of first touches are detected to be released, the plurality of first time durations exceeds a second predetermined time period, another touch corresponding to a confirm icon displayed on the display module is detected, or a press on a physical button of the electronic device is detected.

13. The messaging method of claim 11, the step of recording the message further comprises:
highlighting the first contact icon and dimming at least one second contact icon displayed on the display module in response to the plurality of first time durations exceed the first predetermined time period.

14. The messaging method of claim 11, wherein the first contact icon corresponds to a contact or a group of contacts, and the first contact icon is shown in a chat history list, a contact list or a favorite contact list.

15. The messaging method of claim 11, wherein the message is a voice message, an audio message, a video message, an image message or a text message.

16. The messaging method of claim 15, wherein the text message is converted from another voice message by a voice recognition program.

17. The messaging method of claim 11, wherein in response to the reply message is sent, the electronic device returns to the standby mode or resumes executing the second application program.

18. A non-transitory computer-readable medium including one or more sequences of instructions to be executed by a processor of an electronic device for performing the messaging method of claim 11.

* * * * *